United States Patent
Ikeno (10) Patent No.: US 10,471,905 B2
(45) Date of Patent: Nov. 12, 2019

(54) IN-VEHICLE CAMERA

(71) Applicant: TOYOTA JIDOSHA KABUSHIKI KAISHA, Toyota-shi, Aichi-ken (JP)

(72) Inventor: Eisuke Ikeno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 15/457,027

(22) Filed: Mar. 13, 2017

(65) Prior Publication Data

US 2017/0334365 A1    Nov. 23, 2017

(30) Foreign Application Priority Data

May 17, 2016  (JP) ................. 2016-098600

(51) Int. Cl.
| | | |
|---|---|---|
| B60R 11/04 | (2006.01) | |
| H04N 7/18 | (2006.01) | |
| B60R 11/00 | (2006.01) | |

(52) U.S. Cl.
CPC ............. B60R 11/04 (2013.01); H04N 7/183 (2013.01); *B60R 2011/0026* (2013.01)

(58) Field of Classification Search
CPC combination set(s) only.
See application file for complete search history.

(56) References Cited

U.S. PATENT DOCUMENTS

| | | | |
|---|---|---|---|
| 5,096,287 A | * | 3/1992 | Kakinami .......... B60R 1/12 352/131 |
| 6,170,955 B1 | | 1/2001 | Campbell et al. |
| 2005/0001901 A1 | * | 1/2005 | Eggers ............ B60R 11/04 348/118 |
| 2010/0314378 A1 | | 12/2010 | Grunert et al. |
| 2012/0026330 A1 | | 2/2012 | Huelsen et al. |
| 2015/0015713 A1 | * | 1/2015 | Wang ............ H04N 7/18 348/148 |
| 2015/0042804 A1 | * | 2/2015 | Okuda ............ B60R 11/04 348/148 |
| 2016/0167595 A1 | | 6/2016 | Kang et al. |
| 2016/0227079 A1 | * | 8/2016 | Oh ................. B60R 11/04 |

FOREIGN PATENT DOCUMENTS

| | | |
|---|---|---|
| DE | 102015015952 A1 | 6/2016 |
| JP | 2002-504453 A | 2/2002 |
| JP | 2013-203250 A | 10/2013 |
| JP | 2014-037344 A | 2/2014 |
| JP | 2015-193366 A | 11/2015 |
| WO | 2015176719 A1 | 11/2015 |

\* cited by examiner

*Primary Examiner* — Alexander Gee
(74) *Attorney, Agent, or Firm* — Oliff PLC (57) ABSTRACT

An in-vehicle camera including: a camera component that records out of the vehicle through a window glass; a cover that covers the camera component from the vehicle interior side, with a gap existing between the cover and the window glass; and a blocker that is secured to a vehicle interior-side surface of the window glass inside the cover and is configured to allow passage of air between the inside and the outside of the cover via the gap while blocking light passing through the gap and reflected into the camera component.

6 Claims, 7 Drawing Sheets

IN-VEHICLE CAMERA

CROSS-REFERENCE TO RELATED APPLICATION

This application is based on and claims priority under 35 USC 119 from Japanese Patent Application No. 2016-098600 filed on May 17, 2016, the disclosure of which is incorporated by reference herein.

BACKGROUND

Technical Field

The present disclosure relates to an in-vehicle camera.

Related Art

Japanese Patent Application Laid-open (JP-A) No. 2013-203250 discloses an in-vehicle camera for recording in a vehicle forward direction through a front glass. The in-vehicle camera is equipped with a bracket and a camera component. The bracket is adhered to a vehicle interior-side surface of the front glass, and the camera component is secured to the bracket.

In this connection, in the in-vehicle camera disclosed in JP-A No. 2013-203250, when covering the camera component with a cover from the vehicle interior side, a gap that becomes necessary in consideration of variations between parts is disposed between the cover and the front glass.

However, there is the concern that an unintended image of the instrument panel, for example, will be reflected by the front glass, pass through the gap (particularly the gap at the front end portion of the cover), and be reflected into the camera component.

Therefore, in order to prevent an unintended image from being reflected, it would be conceivable to increase the size of the cover in the vehicle forward direction. However, if the size of the cover were to be increased, the obstruction to the field of view of the driver would increase, which is not desirable.

Furthermore, the gap also has the role of taking, into the inside of the cover, air from a defroster device disposed in the instrument panel. For that reason, for example, if the front end of the hood in JP-A No. 2013-203250 were to be brought into contact with the front glass or the front end of the cover were to be brought into contact with the front glass to thereby completely close off the gap, fog on the front glass would become unable to be cleared away by the air from the defroster device.

SUMMARY

In view of the circumstances described above, the present disclosure provides an in-vehicle camera that can control the reflection of unintended images without having to increase the size of the cover and can clear away fog on the window glass by means of the passage of air from the outside of the cover.

An in-vehicle camera of a first aspect of the disclosure includes: a camera component that records out of the vehicle through a window glass; a cover that covers the camera component from the vehicle interior side, with a gap existing between the cover and the window glass; and a blocker that is secured to a vehicle interior-side surface of the window glass inside the cover and is configured to allow passage of air between the inside and the outside of the cover via the gap while blocking light passing through the gap and reflected into the camera component.

In the in-vehicle camera of the first aspect of the disclosure, the camera component that records out of the vehicle through the window glass is covered from the vehicle interior side by the cover. At this time, a gap exists between the cover and the window glass, and the inside and the outside of the cover are communicated with each other by the gap. For this reason, air from a defroster device or the like can enter the inside of the cover via the gap, so fog on the window glass positioned in the recording range of the camera component can be cleared away.

Moreover, the blocker is secured to the vehicle interior-side surface of the window glass inside the cover. The blocker is configured to allow passage of air between the inside and the outside of the cover via the gap while blocking light passing through the gap and reflected into the camera component. For this reason, the function of clearing away fog on the window glass by means of the passage of air via the gap is maintained, while unintended images are kept from being reflected into the camera component (wrong images). Additionally, wrong images can be controlled by the blocker, so it is not necessary to increase the size of the cover in order to control wrong images.

Consequently, according to the in-vehicle camera of the first aspect of the disclosure, wrong images can be controlled without having to increase the size of the cover, and fog on the window glass can be cleared away by means of the passage of air from the outside of the cover.

An in-vehicle camera of a second aspect of the disclosure is the in-vehicle camera of the first aspect, further including a bracket that is secured to the vehicle interior-side surface of the window glass and directly or indirectly supports the camera component, wherein the blocker is formed integrally with the bracket.

In the in-vehicle camera of the second aspect of the disclosure, the bracket that directly or indirectly supports the camera component is secured to the vehicle interior-side surface of the window glass. Additionally, the blocker is formed integrally with the bracket. For this reason, the work of securing the bracket to the window glass and the work of securing the blocker to the window glass do not need to be carried out separately and independently. Thus, it is easy to install the in-vehicle camera in the vehicle.

An in-vehicle camera of a third aspect of the disclosure is the in-vehicle camera of the first or second aspect, wherein the blocker is configured to include a wall portion that extends in a direction substantially orthogonal to the light, and the wall portion has a slit or hole that allows the passage of air.

In the in-vehicle camera of the third aspect of the disclosure, the blocker is configured to include the wall portion that extends in a direction substantially orthogonal to the light passing through the gap and reflected into the camera component, so the light can be efficiently blocked by the wall portion. Furthermore, the wall portion has a slit or a hole, so the passage of air between the inside and the outside of the cover via the gap is allowed. Consequently, according to the in-vehicle camera of the third aspect of the disclosure, the blocker can be realized by means of this simple configuration.

An in-vehicle camera of a fourth aspect of the disclosure is the in-vehicle camera of the first or second aspect, wherein the blocker is configured to include two wall portions that each extend in a direction substantially orthogonal to the light and are placed opposing each other, at least one wall portion among the two wall portions has a slit or hole that allows the passage of air, and the other wall portion is placed so as to block the light passing through the slit or hole in the one wall portion.

In the in-vehicle camera of the fourth aspect of the disclosure, the blocker is configured to include the two wall portions. Each of the two wall portions extends in a direction substantially orthogonal to the light passing through the gap and reflected into the camera component. Additionally, the two wall portions are placed opposing each other. Additionally, at least one wall portion among the two wall portions has a slit or hole, and the other wall portion is placed so as to block the light passing through the slit or hole in the one wall portion. Being configured as described above, the blocker allows the passage of air between the inside and the outside of the cover via the gap while blocking light passing through the gap and reflected into the camera component. Consequently, according to the in-vehicle camera of the fourth aspect of the disclosure, the blocker whose wrong image controlling effect is high can be realized by means of this simple configuration.

As described above, the in-vehicle camera pertaining to the present disclosure has the superior effect that it can control the reflection of unintended images without having to increase the size of the cover and can clear away fog on the window glass by means of the passage of air from the outside of the cover.

BRIEF DESCRIPTION OF THE DRAWINGS

An exemplary embodiment of the present disclosure will be described in detail based on the following figures, wherein.

DETAILED DESCRIPTION

An in-vehicle camera 10 pertaining to an embodiment of the present disclosure will be described below.

Figure 2:
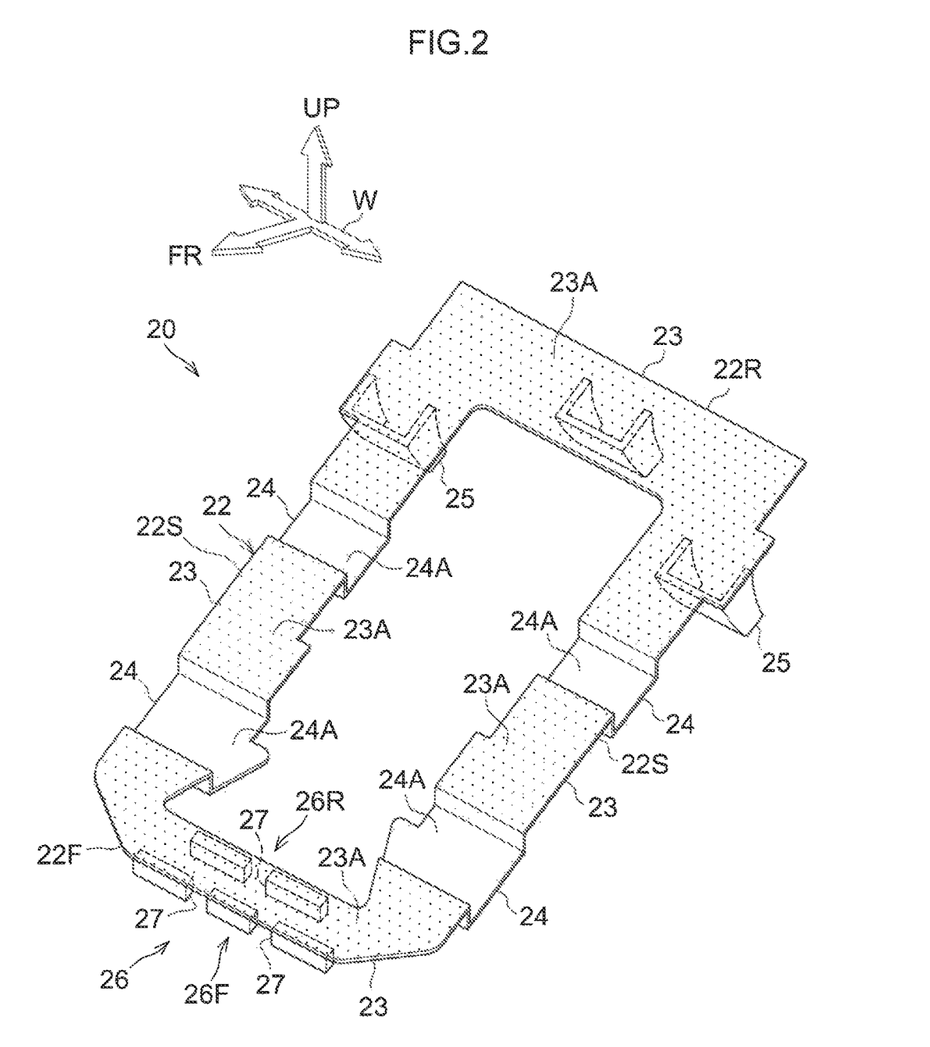
FIG. 2 is a perspective view showing, as seen obliquely from above, an upper bracket shown in FIG. 1.
Figure 3:
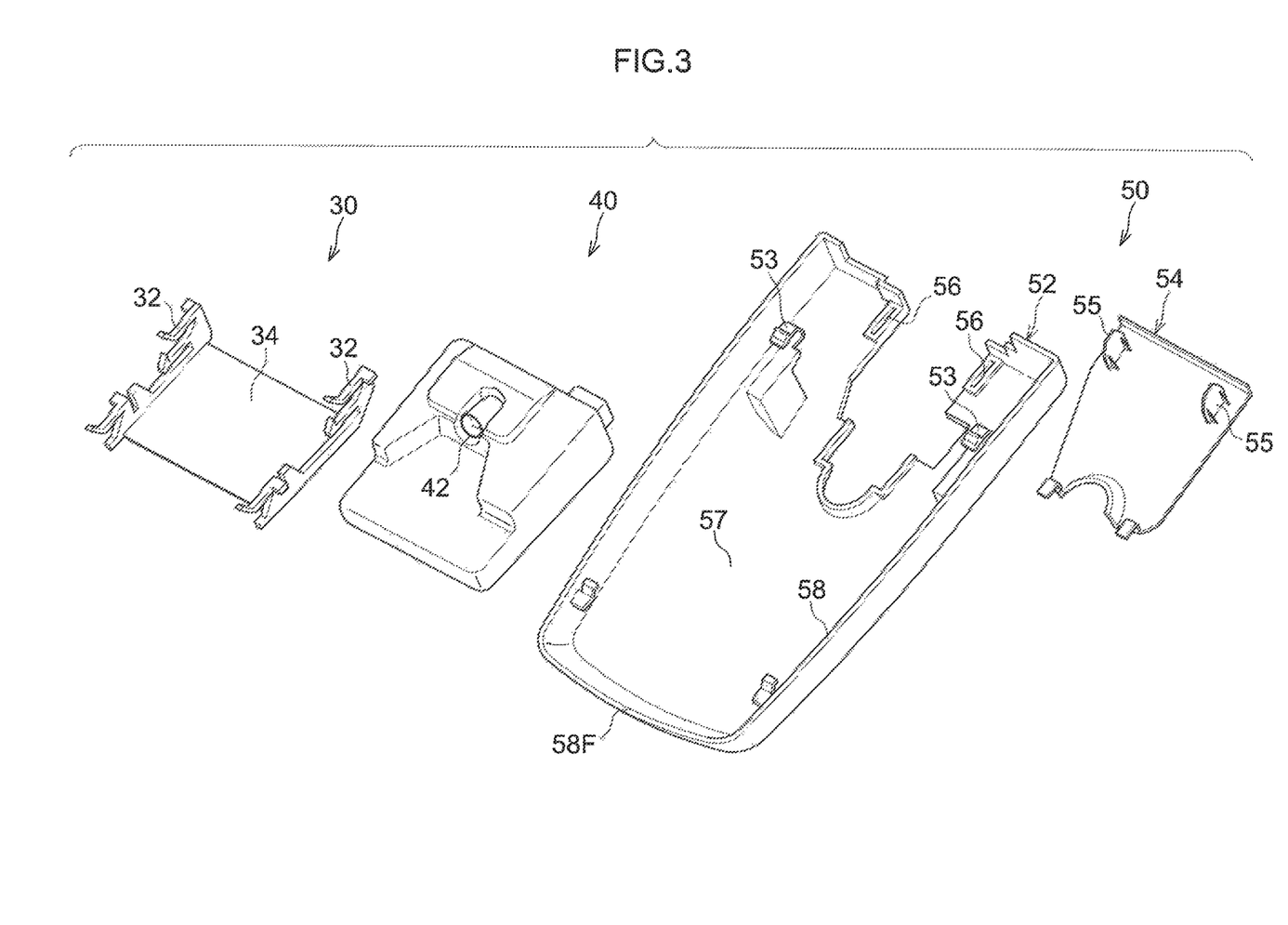
FIG. 3 is an exploded perspective view showing a camera support bracket, a camera component, and a cover that configure the in-vehicle camera pertaining to the embodiment.

As shown in FIG. 2 and FIG. 3, the in-vehicle camera 10 pertaining to the present embodiment is equipped with an upper bracket 20 serving as a "bracket", a camera support bracket 30, a camera component 40, and a cover 50.

The in-vehicle camera 10 in a state in which is installed in a vehicle will be described below using FIG. 1, FIG. 4, and FIG. 5.

Figure 5:
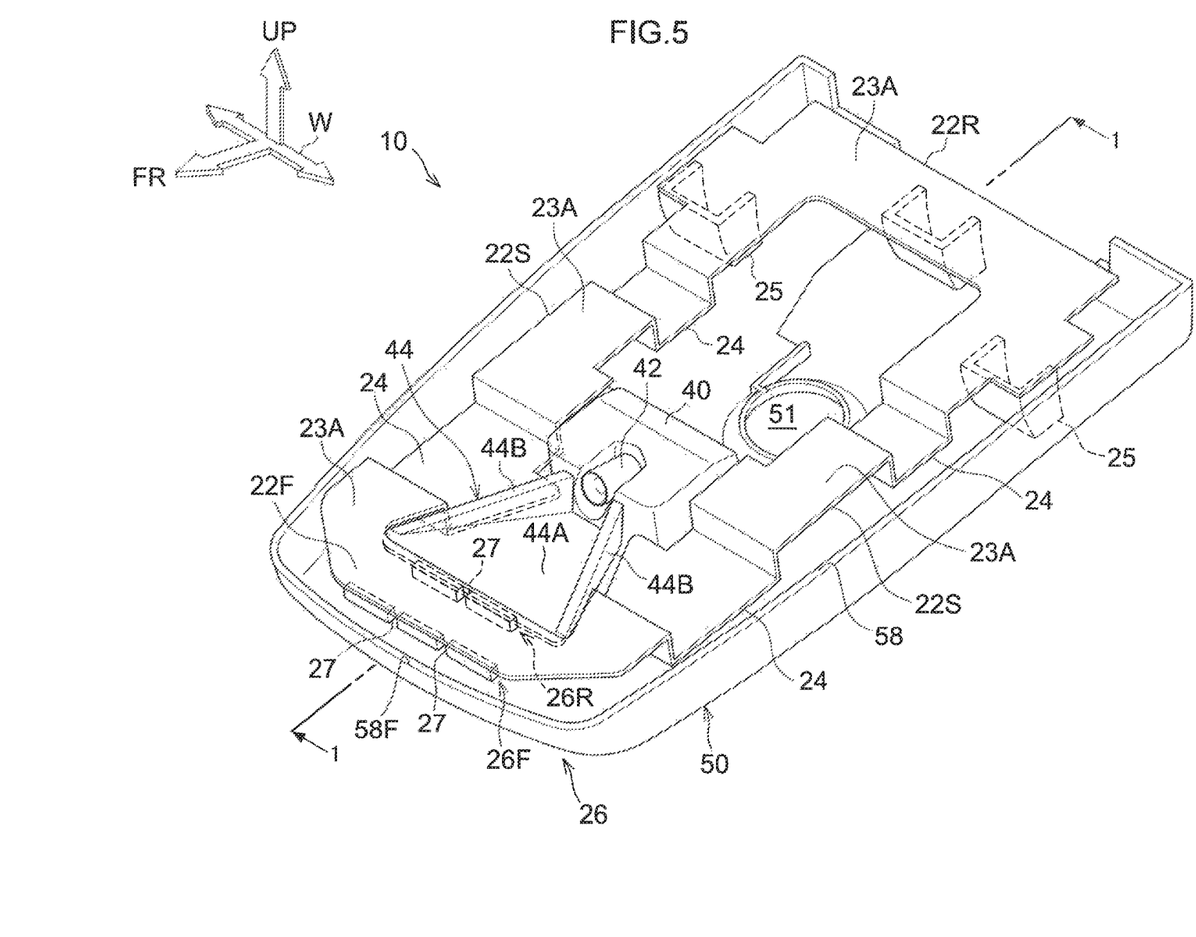
FIG. 5 is a perspective view, seen obliquely from a vehicle upper direction, showing the in-vehicle camera pertaining to the embodiment.

In FIG. 5 the in-vehicle camera 10 in an installed state is shown by way of a perspective view from the vehicle outside (the camera support bracket 30 and a front glass 60 serving as a "window glass" are omitted). Furthermore, in FIG. 1 is shown a sectional view (a sectional view along line 1-1 of FIG. 5) in which the section of the front glass 60 having the in-vehicle camera 10 installed thereon is cut by a plane orthogonal to the vehicle width direction. It should be noted that arrows FR, UP, and W in the drawings indicate the vehicle forward direction, the vehicle upward direction, and the vehicle width direction.

—Front Glass—

Figure 1:
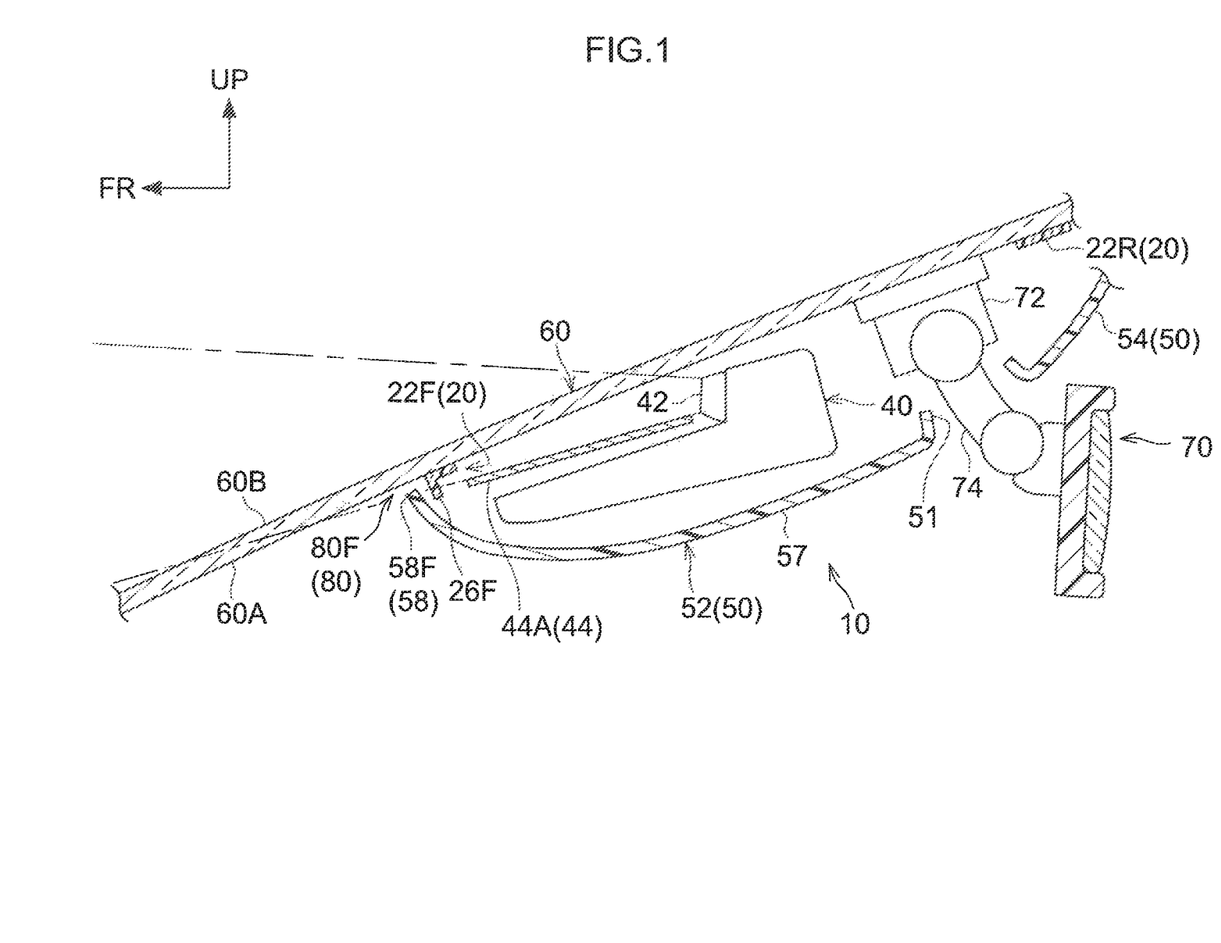
FIG. 1 is a sectional view (a sectional view along line 1-1 of FIG. 5) in which an in-vehicle camera pertaining to the embodiment is cut by a plane orthogonal to the vehicle width direction.

As shown in FIG. 1, the front glass 60 is attached in a sloping state to the vehicle body in such a way that the normal direction of the glass surface thereof (a vehicle exterior-side surface 60B) faces a vehicle obliquely upward direction that is the vehicle upward direction and the vehicle forward direction. Because of this, the angle of the front glass 60 (particularly the section having the in-vehicle camera 10 shown in FIG. 1 installed thereon, namely, the section of the front glass 60 positioned in the vehicle width direction center and on the vehicle forward and rearward direction rear side) is set to about 25 degrees to about 45 degrees as measured from the horizontal plane. The inside of the vehicle and the outside of the vehicle are demarcated from each other by the front glass 60.

—Camera Component—

The camera component 40 is placed on the vehicle interior side of the front glass 60. The camera component 40 has an imaging component 42 whose recording direction coincides with the vehicle forward direction, and the camera component 40 is configured to record in the vehicle forward direction through the front glass 60. A field-of-view regulating member 44 is disposed on the vehicle front side of the imaging component 42 (see FIG. 5). The field-of-view regulating member 44 is equipped with a lower regulating portion 44A and a pair of side regulating portions 44B, and regulates the recording range of the camera component 40 from the vehicle lower direction and the vehicle side directions.

An inner mirror 70 is placed on the vehicle rear side of the camera component 40 (the inner mirror 70 is not shown in FIG. 5). The inner mirror 70 is a mirror for allowing the driver to check the vehicle rearward direction, and a base portion 72 thereof is secured to a vehicle interior-side surface 60A of the front glass 60.

—Cover—

The cover 50 is disposed on the vehicle interior side of the front glass 60. As shown in FIG. 3, the cover 50 has a shape—a bowl shape (a dome shape)—where an end portion 58 configuring the peripheral edge thereof rises upright relative to a bottom portion 57. Furthermore, as shown in FIG. 5, the cover 50 has an insertion hole 51 through which an arm portion 74 of the inner mirror 70 is inserted. Additionally, the end portion 58 of the cover 50 is placed in close proximity to the vehicle interior-side surface 60A of the front glass 60, and the arm portion 74 of the inner mirror 70 is inserted through the insertion hole 51 in the cover 50. Because of this, the cover 50 is placed so as to cover the camera component 40 and the base portion 72 of the inner mirror 70 from the vehicle interior side. The cover 50 demarcates the inside of the cover 50, which is the section of the vehicle interior surrounded by the cover 50, and the outside of the cover, which is the section outside that, from each other.

—Gap—

A gap 80 is formed between the end portion 58 of the cover 50 and the front glass 60. The outside and the inside of the cover 50 are communicated with each other by the gap 80. In particular, as shown in FIG. 1, a front gap 80F is formed between a front end portion 58F of the cover 50 (the section on the vehicle front side of the end portion 58 configuring the peripheral edge of the cover 50; see FIG. 3 and FIG. 5) and the front glass 60. Air from a defroster device or the like (not shown in the drawings) is taken into the inside of the cover 50 via the front gap 80F.

—Upper Bracket—

The upper bracket 20 is secured to the vehicle interior-side surface 60A of the front glass 60 inside the cover 50. As described in a later installation method (procedure), the upper bracket 20 indirectly supports the camera component 40 via the camera support bracket 30 (see FIG. 3; not shown in other drawings).

FIG. 2 shows the upper bracket 20. As shown in this drawing, the upper bracket 20 is equipped with a plate-shaped portion 22 formed in a plate shape.

The plate-shaped portion 22 is formed in the shape of a substantially rectangular loop. Specifically, the plate-shaped portion 22 is configured from a front portion 22F that configures the vehicle front section of the plate-shaped portion 22 and extends in the vehicle width direction, a right and left pair of side portions 22S that extend in the vehicle rearward direction from both vehicle width direction ends of the front portion 22F, and a rear portion 22R that extends in the vehicle width direction so as to interconnect the right and left pair of side portions 22S.

The plate-shaped portion 22 has common portions 23 (the sections indicated by dots in FIG. 2) and step portions 24, and vehicle upper surfaces (the surfaces on the near side in FIG. 2) of the common portions 23 excluding the step portions 24 are configured to be adhesion surfaces 23A that become adhered to the vehicle interior-side surface 60A of the front glass 60. In other words, the plate-shaped portion 22 is configured to include the common portions 23 and the step portions 24 that are stepped in the vehicle downward direction relative to the common portions 23 (in the direction of the vehicle interior relative to the front glass 60). Additionally, the vehicle upper surfaces of the common portions 23 are configured to be the adhesion surfaces 23A that become adhered to the vehicle interior-side surface 60A of the front glass 60, and the vehicle upper surfaces of the step portions 24 are configured to be non-adhesion surfaces 24A that do not become adhered to the front glass 60. In a state in which the adhesion surfaces 23A are adhered to the front glass 60, spaces for the passage of air are formed between the step portions 24 and the front glass 60. A total of four step portions 24 are formed, and two step portions 24 each are formed in each of the right and left pair of side portions 22S of the plate-shaped portion 22.

A front and rear pair of wall portions 26 are disposed on the vehicle lower surface (the surface on the opposite side of the adhesion surface 23A) of the front portion 22F of the plate-shaped portion 22. The front and rear pair of wall portions 26 are disposed projecting in the direction of the vehicle interior, in such a way that their projecting direction (height direction) coincides with a direction perpendicular to the plate-shaped portion 22 (that is to say, a direction perpendicular to the front glass 60), from the vehicle lower surface of the front portion 22F of the plate-shaped portion 22. Furthermore, the front and rear pair of wall portions 26 are configured to include a front wall portion 26F on the front side and a rear wall portion 26R on the rear side, and the front wall portion 26F and the rear wall portion 26R are both disposed extending in the vehicle width direction. In this way, the front wall portion 26F and the rear wall portion 26R are disposed in such a way that their height direction coincides with a directional perpendicular to the front glass 60 and their width direction coincides with the vehicle width direction.

Figure 4:
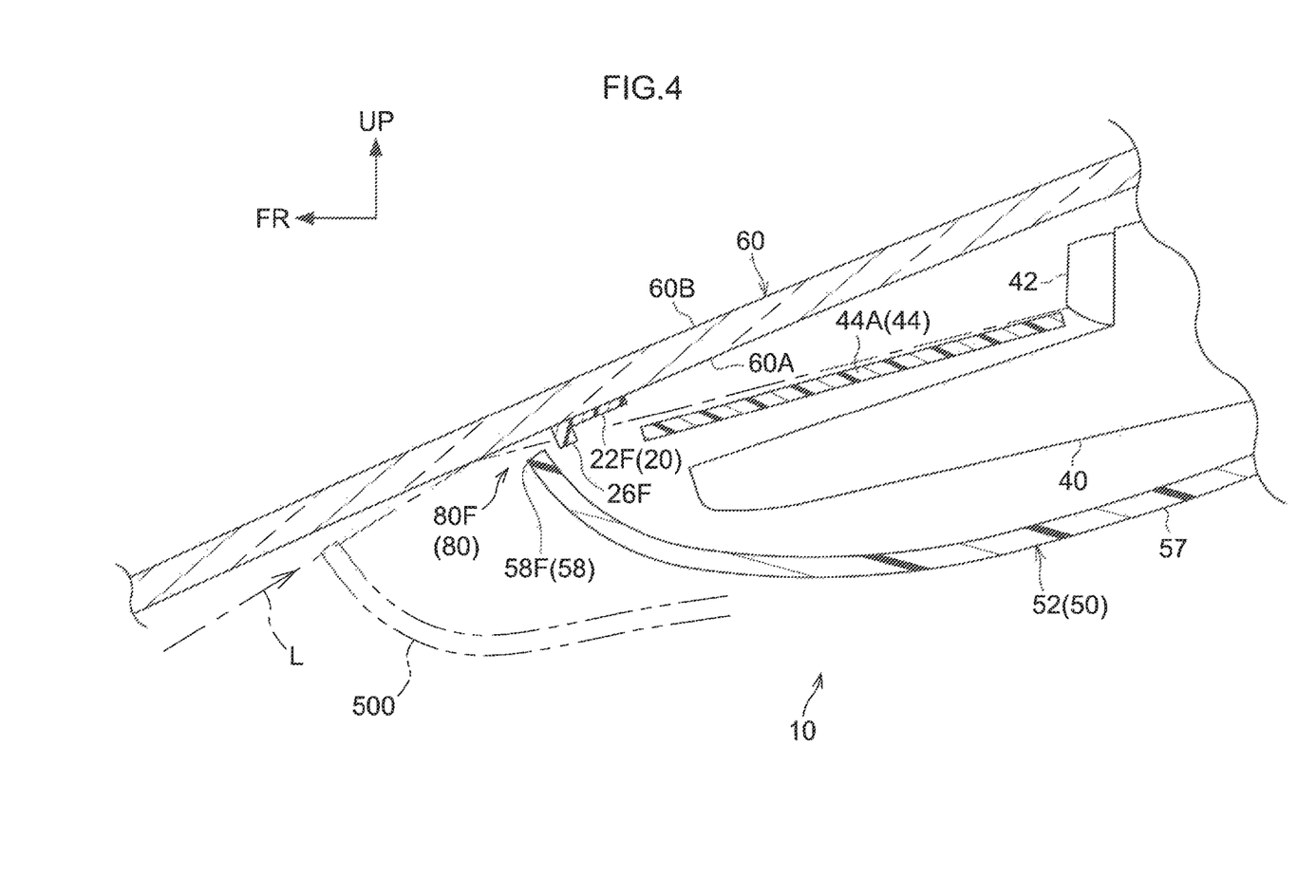
FIG. 4 is an enlarged sectional view of relevant portions in FIG. 1.

As shown in FIG. 4, the front portion 22F of the upper bracket 20 is secured to the vehicle interior-side surface 60A of the front glass 60 inside the cover 50 and is placed on the vehicle rear side of the front gap 80F and the vehicle front side of the imaging component 42 of the camera component 40, and is particularly placed in the neighborhood of the front gap 80F. For that reason, the front and rear pair of wall portions 26 also are placed on the vehicle rear side of the front gap 80F and the vehicle front side of the imaging component 42 of the camera component 40, and are particularly placed in the neighborhood of the front gap 80F (in FIG. 4 only the front wall portion 26F of the front and rear pair of wall portions 26 is shown).

The height (projecting amount) of the wall portions 26 is set to a height (projecting amount) that can block light (see the long dashed short dashed line L in FIG. 4) passing through the front gap 80F and reflected into the camera component 40.

Here, light passing through the front gap 80F and reflected into the camera component 40 will be described.

In the present embodiment, the front gap 80F is positioned in the recording range of the camera component 40. Specifically, the lower regulating portion 44A of the field-of-view regulating member 44 is configured in such a way that the front gap 80F is positioned in the recording range of the camera component 40. For that reason, for example, if light from the instrument panel is reflected by the section of the front glass 60 positioned outside the cover 50 and passes through the front gap 80F, the light is sometimes reflected into the camera component 40 (see the long dashed short dashed line L in FIG. 4). The camera component 40 is for recording in the vehicle forward direction, so if light from the instrument panel is reflected into the camera component 40, this results in the camera component 40 recording a wrong image.

It should be noted that, due to the lower regulating portion 44A of the field-of-view regulating member 44, a reflection of the instrument panel can occur even if the front gap 80F is not positioned in the recording range of the camera component 40. Namely, this is a case where light from the instrument panel passes through the front gap 80F, enters the inside of the cover 50, is thereafter reflected by the section of the front glass 60 positioned inside the cover 50, and is reflected into the camera component 40.

The height (projecting amount) of the wall portions 26 is set to a height (projecting amount) that can block the light reflected (tending to be reflected) in this way.

Furthermore, as shown in FIG. 2 and FIG. 5, the front wall portion 26F has two slits 27 that divide the front wall portion 26F itself into three in the vehicle width direction. Furthermore, the rear wall portion 26R has one slit 27 that divides the rear wall portion 26R itself into two in the vehicle width direction. Because of these slits 27, the passage of air between the inside and the outside of the cover 50 via the front gap 80F is smoothly carried out (smoothly takes place).

Furthermore, the relationship between the placement of the slits 27 in the front wall portion 26F and the placement of the slit 27 in the rear wall portion 26R is as follows. Namely, the light passing through the slits 27 in the front wall portion 26F and tending to be reflected into the camera component 40 is configured to be blocked by the rear wall portion 26R, and the light passing through the slit in the rear wall portion 26R and tending to be reflected into the camera component 40 is configured to be blocked by the front wall portion 26F.

In summary, the front portion 22F of the plate-shaped portion 22 is secured to the vehicle interior-side surface 60A of the front glass 60 inside the cover 50, and the front and rear pair of wall portions 26 disposed on the front portion 22F are configured to allow, by means of the slits 27, passage of air between the inside and the outside of the cover 50 via the front gap 80F while blocking, by means of the front wall portion 26F and the rear wall portion 26R, light passing through the front gap 80F and reflected into the camera component 40. Thus, the front portion 22F of the upper bracket 20 on which the front and rear pair of wall portions 26 are disposed corresponds to the "blocker" of the present disclosure.

<Operation and Effects>

Next, a method (procedure) of installing the camera 10 pertaining to the present embodiment in the vehicle will be described, and the operation and effects of the in-vehicle camera 10 pertaining to the present embodiment will also be described.

First, the upper bracket 20 is secured to the vehicle interior-side surface 60A of the front glass 60 (see FIG. 1).

Specifically, the upper bracket 20 is equipped with the adhesion surfaces 23A (see FIG. 2), and the adhesion surfaces 23A are adhered to the vehicle interior-side surface 60A of the section of the front glass 60 positioned in the vehicle width direction center and on the vehicle forward and rearward direction rear side.

Next, the camera support bracket 30 is attached to the upper bracket 20.

Specifically, the upper bracket 20 is equipped with engagement counterpart portions (not shown in the drawings), and engagement portions 32 of the camera support bracket 30 (see FIG. 3) become engaged with the engagement counterpart portions.

Then, the camera component 40 is attached to the camera support bracket 30.

Specifically, the camera support bracket 30 is equipped with a camera mount portion 34 (see FIG. 3), and the camera component 40 is attached in a state in which it is mounted on the camera mount portion 34. Because of this, the camera component 40 is indirectly supported by the upper bracket 20.

Finally, the cover 50 is attached to the upper bracket 20.

Specifically, the cover 50 comprises a camera cover 52 and a mirror cover 54 (see FIG. 3). The camera cover 52 has attachment portions 53 that become attached to attachment portions 25 of the upper bracket 20, and the mirror cover 54 has engagement portions 55 that become attached to, in such a way as to engage with, engagement counterpart holes 56 in the camera cover 52. Because of this, the upper bracket 20, the camera support bracket 30, and the camera component 40 are covered from the vehicle interior side by the cover 50.

In this way, the in-vehicle camera 10 is installed in the vehicle.

In the in-vehicle camera 10 pertaining to the present embodiment, the camera component 40 that records out of the vehicle through the front glass 60 is covered from the vehicle interior side by the cover 50. Additionally, the gap 80 is formed between the front glass 60 and the cover 50, and the inside and the outside of the cover 50 are communicated with each other by the gap 80. For this reason, air from a defroster device or the like can enter the inside of the cover 50 via the gap 80 (particularly the front gap 80F), so fog on the front glass 60 positioned in the recording range of the camera component 40 can be cleared away.

Moreover, in the in-vehicle camera 10 pertaining to the present embodiment, the front portion 22F (blocker) of the plate-shaped portion 22 of the upper bracket 20 is secured to the vehicle interior-side surface 60A of the front glass 60 inside the cover 50. The front and rear pair of wall portions 26 are disposed on the front portion 22F of the plate-shaped portion 22 of the upper bracket 20, and the front and rear pair of wall portions 26 are configured to allow the passage of air between the inside and the outside of the cover 50 via the front gap 80F while blocking light passing through the front gap 80F and reflected into the camera component 40. For this reason, the function of clearing away fog on the front glass 60 by means of the passage of air via the front gap 80F is maintained, while unintended images are kept from being reflected into the camera component 40 (wrong images).

In this connection, if a blocker were not disposed and the reflection of unintended images were to be controlled with the front gap 80F being ensured as is, the size of the cover 50 would need to be increased in the vehicle forward direction as indicated by long dashed double-short dashed line 500 in FIG. 4. Increasing the size of the cover 50 in the vehicle forward direction results in a greater obstruction to the field of view of the driver, which is not desirable. In contrast to this, according to the in-vehicle camera 10 pertaining to the present embodiment, by disposing the blocker (the front portion 22F), wrong images can be controlled without having to make the cover 50 larger and the function of clearing away fog on the front glass 60 can be ensured.

Furthermore, in the in-vehicle camera 10 pertaining to the present embodiment, the upper bracket 20 that indirectly supports the camera component 40 via the camera support bracket 30 is secured to the vehicle interior-side surface 60A of the front glass 60. Additionally, the blocker is formed on part (the front portion 22F of the plate-shaped portion 22) of the upper bracket 20. In other words, the blocker is formed integrally with the upper bracket 20. For this reason, the work of securing the upper bracket 20 to the front glass 60 and the work of securing the blocker to the front glass 60 do not need to be carried out separately and independently. Thus, it is easy to install the in-vehicle camera 10 in the vehicle.

Furthermore, in the in-vehicle camera 10 pertaining to the present embodiment, the front and rear pair of wall portions 26 configuring the blocker are disposed in such a way that their height direction coincides with a direction perpendicular to the front glass 60 and their width direction coincides with the vehicle width direction. In contrast to this, the direction of the light passing through the front gap 80F and reflected (tending to be reflected) into the camera component 40 generally is the substantially vehicle forward and rearward direction as seen in a plan view and is a direction along the front glass 60 as seen in a side view. Furthermore, the recording direction of the camera component 40 coincides with the vehicle forward direction.

Thus, it can be said that the front and rear pair of wall portions 26 configuring the blocker pertaining to the present embodiment extend in a direction substantially orthogonal to the light passing through the front gap 80F and reflected into the camera component 40. Furthermore, it can also be said that the front and rear pair of wall portions 26 configuring the blocker pertaining to the present embodiment extend in a direction substantially orthogonal to the recording direction of the camera component 40 (the vehicle forward direction). For this reason, the light passing through the front gap 80F and reflected into the camera component 40 can be efficiently blocked.

Furthermore, the front and rear pair of wall portions 26 have the slits 27 that penetrate the wall portions 26 in the vehicle forward and rearward direction, so the passage of air between the inside and the outside of the cover 50 via the front gap 80F is allowed.

Moreover, in the in-vehicle camera 10 pertaining to the present embodiment, the blocker is configured to include two wall portions (the front and rear pair of wall portions 26). The front wall portion 26F and the rear wall portion 26R that configure the front and rear pair of wall portions 26 are placed opposing each other and have the slits 27. Additionally, it is configured that the light passing through the slits 27 in the front wall portion 26F and tending to be reflected into the camera component 40 is blocked by the rear wall portion 26R, and it is configured that the light passing through the slit 27 in the rear wall portion 26R and tending to be reflected into the camera component 40 is blocked by the front wall portion 26F. For this reason, the front wall portion 26F and the rear wall portion 26R are configured to allow the passage of air between the inside and the outside of the cover 50 via the front gap 80F while blocking the light passing through the front gap 80F and reflected into the camera component 40.

Furthermore, in the in-vehicle camera 10 pertaining to the present embodiment, the plate-shaped portion 22 of the upper bracket 20 is configured to include the common portions 23 and the step portions 24 that are stepped in the vehicle downward direction relative to the common portions 23 (in the direction of the vehicle interior relative to the front glass 60). Additionally, the vehicle upper surfaces of the common portions 23 are configured to be adhesion surfaces 23A that become adhered to the vehicle interior-side surface 60A of the front glass 60, and the vehicle upper surfaces of the step portions 24 are configured to be non-adhesion surfaces 24A that do not become adhered to the front glass 60. In a state in which the adhesion surfaces 23A are adhered to the front glass 60, spaces for the passage of air are formed between the step portions 24 and the front glass 60. The spaces formed between the step portions 24 and the front glass 60 make it easier for the air inside the cover 50 to be expelled to the outside, so the passage of air between the inside and the outside (the passage of air from the outside to the inside) of the cover 50 via the front gap 80F is promoted.

Example Modifications of Blocker

The front and rear pair of wall portions 26 of the embodiment are merely one example of the "blocker", and various configurations can be employed for the "blocker" of the present disclosure.

Figure 6A:
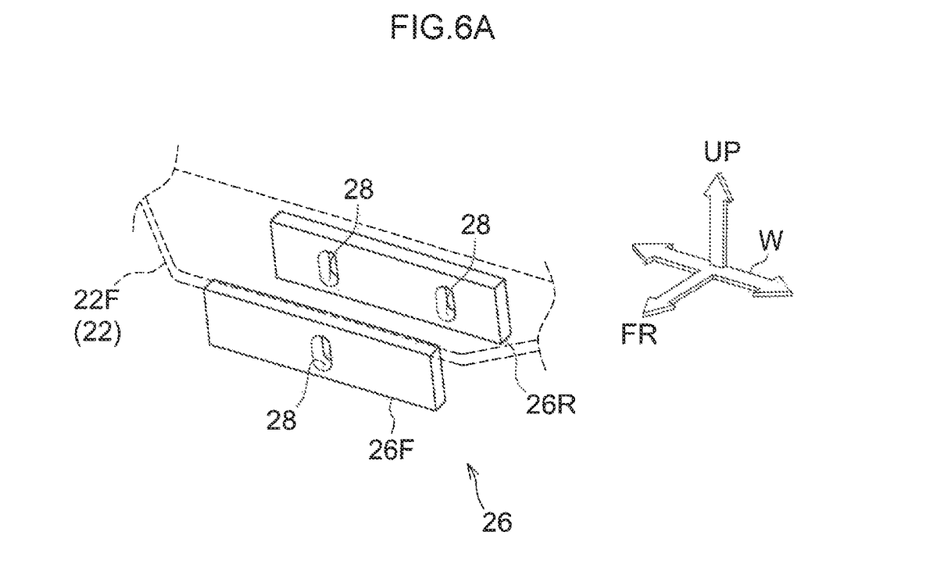
FIG. 6A is a perspective view showing a blocker pertaining to example modification 1.

FIG. 6A shows a blocker of example modification 1. As shown in this drawing, in example modification 1, the front and rear pair of wall portions 26 have, instead of the slits 27, holes 28 that penetrate the wall portions 26. The holes 38 allow the passage of air between the inside and the outside of the cover 50 via the front gap 80F. The positions in which the holes 28 are formed and the number of the holes 28 are not particularly limited; it suffices for the front wall portion 26F and the rear wall portion 26R to work together to block the light passing through the front gap 80F and reflected into the camera component 40.

Figure 6B:
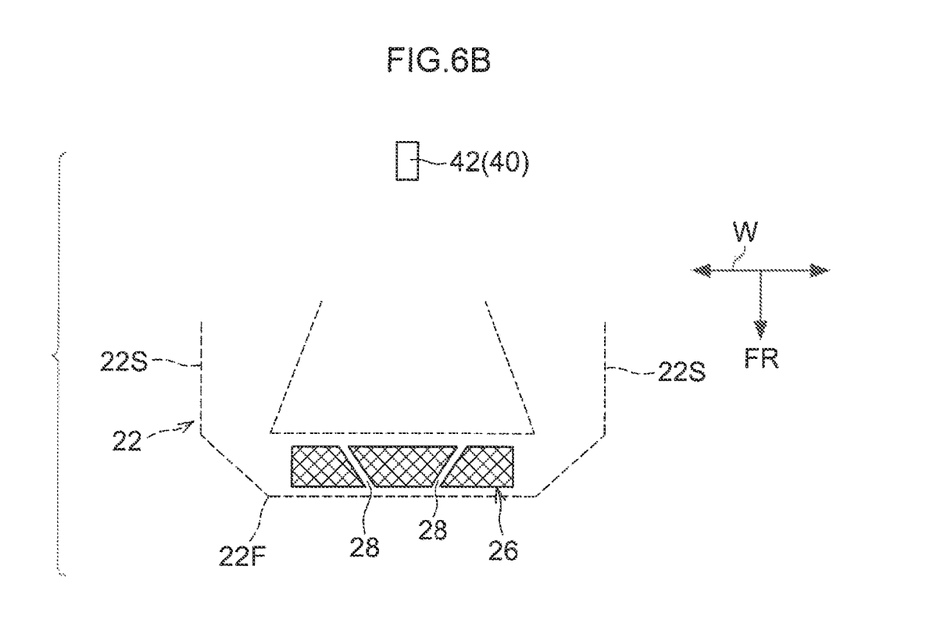
FIG. 6B is a plan view (a view seen from a direction perpendicular to the upper bracket) showing a blocker pertaining to example modification 2.

FIG. 6B shows a blocker of example modification 2. As shown in this drawing, in example modification 2, one wall portion 26 extending in the vehicle width direction is disposed on the front portion 22F of the plate-shaped portion 22 of the upper bracket 20. The wall portion 26 has two holes 28 that penetrate the wall portion 26 in the vehicle forward and rearward direction. The two holes 28 are disposed side by side in the vehicle width direction, and each of the holes 28 is disposed sloping outward in the vehicle width direction heading from the vehicle front side to the vehicle rear side.

In this way, in example modification 2, there is only one wall portion 26 configuring the blocker, but the directions of the holes 28 penetrating the wall portion 26 are set so as to not coincide with the direction of the light reflected into the camera component 40. For this reason, light that has passed through the front gap 80F passes through the holes 28 and is kept from being reflected into the camera component 40. It should be noted that in example modification 2 the thickness (the dimension in the vehicle forward and rearward direction) of the wall portion 26 is set thicker than that of the wall portions 26 in the embodiment.

As will be understood from the embodiment, example modification 1, and example modification 2, various configurations can be employed for the "blocker" of the present disclosure provided that the blocker allows the passage of air between the inside and the outside of the cover via the gap while blocking light passing through the gap and reflected into the camera component. It should be noted that the phrase "blocking light passing through the gap and reflected into the camera component" is not a phrase limiting the "blocker" of the present disclosure to something that completely prevents the reflection of unintended images. The "blocker" of the present disclosure includes even a blocker by which an unintended image can be reflected a little.

Supplemental Description of Embodiment

In the embodiment, the upper bracket 20 indirectly supports the camera component 40 via the camera support bracket 30, but the present disclosure is not limited to this. For example, the in-vehicle camera may also not be equipped with the camera support bracket 30, so that the upper bracket is configured to directly support the camera component. Furthermore, in the embodiment, the front and rear pair of wall portions 26 are disposed on part (the front portion 22F of the plate-shaped portion 22) of the upper bracket 20 that indirectly supports the camera component 40, and this part (the front portion 22F of the plate-shaped portion 22) configures the blocker. That is to say, in the embodiment, the blocker is formed integrally with the upper bracket 20 that indirectly supports the camera component 40. However, the present disclosure is not limited to this.

Figure 7:
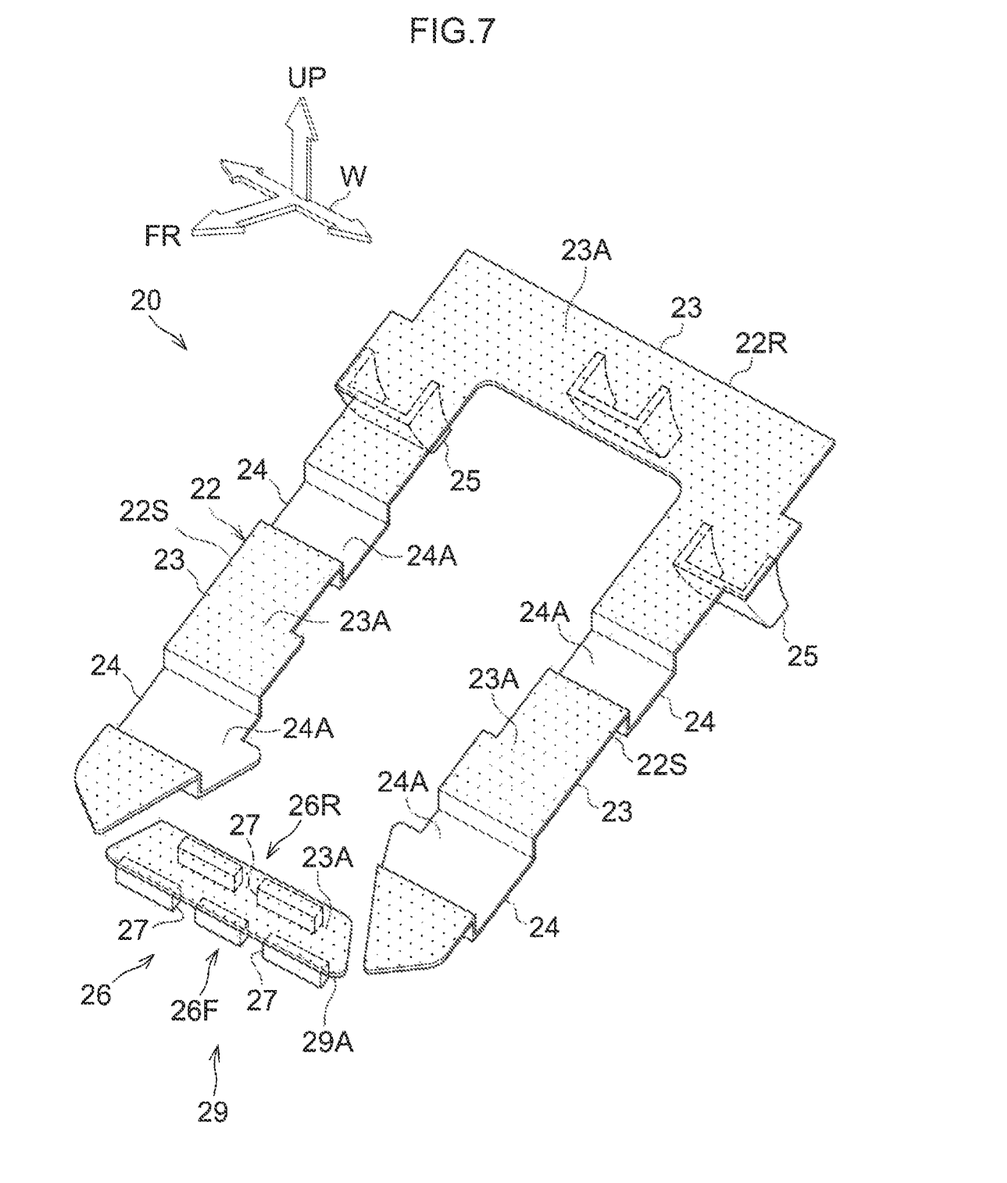
FIG. 7 is a perspective view showing the upper bracket and a blocking member of the in-vehicle camera pertaining to another embodiment.

For example, as shown in FIG. 7, the in-vehicle camera may also be equipped with a blocking member 29 formed separately from the upper bracket 20. The blocking member 29 is equipped with an adhesion portion 29A, one surface of which serves as an adhesion surface 23A that becomes adhered to the vehicle interior-side surface 60A of the front glass 60, and the front and rear pair of wall portions 26, which project from the other surface of the adhesion portion 29A. The configuration of the front and rear pair of wall portions 26 is the same as in the embodiment, so description thereof is omitted here. In the aspect shown in this drawing, the blocking member 29 corresponds to the "blocker" of the present disclosure.

Furthermore, in the embodiment, the in-vehicle camera 10 is for recording in the vehicle forward direction through the front glass, but the present disclosure is not limited to this. It suffices for the in-vehicle camera to be for recording out of the vehicle through a glass, so, for example, the in-vehicle camera may also be for recording in the vehicle rearward direction through a rear glass. Furthermore, in the embodiment, the in-vehicle camera 10 is equipped with the field-of-view regulating member 44, but the present disclosure is not limited to this and may also not be equipped with the field-of-view regulating member.

What is claimed is:

1. An in-vehicle camera comprising:
   a camera component configured to record out of a vehicle through a window glass;
   a cover covering the camera component from a vehicle interior side, with a gap existing between the cover and the window glass; and
   a blocker directly secured to a vehicle interior-side surface of the window glass inside the cover at a position between the gap and an imaging component of the camera component such that the blocker protrudes toward the vehicle interior side from the window glass at a position between the gap and the imaging component of the camera component, the blocker being configured to allow passage of air between the inside and the outside of the cover via the gap while blocking light passing through the gap and reflected into the camera component, the gap being formed between the cover and the blocker at a portion of the blocker that is secured to the vehicle interior-side surface of the window glass.

2. The in-vehicle camera according to claim 1, further comprising a bracket secured to the vehicle interior-side surface of the window glass and supporting the camera component, wherein the blocker is formed integrally with the bracket.

3. The in-vehicle camera according to claim 1, wherein:
   the blocker is configured to include a wall portion that extends in a direction orthogonal to a recording direction of the camera component, and
   the wall portion has a hole that allows the passage of air.

4. The in-vehicle camera according to claim 1, wherein:
   the blocker is configured to include two wall portions extending in a direction orthogonal to a recording direction of the camera component, the two wall portions being positioned opposing each other, a first wall portion of the two wall portions has a hole that allows the passage of air, and
   a second wall portion of the two wall portions is positioned so as to block the light passing through the hole in the first wall portion.

5. The in-vehicle camera according to claim 1, wherein:
   the blocker includes a wall portion having a hole that penetrates the wall portion in a vehicle forward and rearward direction, the hole being disposed sloping outward in a vehicle width direction heading from a vehicle front side to a vehicle rear side.

6. The in-vehicle camera according to claim 1, wherein:
   the blocker includes a wall portion having two holes that penetrate the wall portion in a vehicle forward and rearward direction, the two holes being disposed side by side in a vehicle width direction, each hole of the two holes is disposed sloping outward in the vehicle width direction heading from a vehicle front side to a vehicle rear side.

* * * * *